US009973573B2

(12) United States Patent
Burns et al.

(10) Patent No.: US 9,973,573 B2
(45) Date of Patent: May 15, 2018

(54) CONCURRENCY REDUCTION SERVICE

(71) Applicant: International Business Machines Corporation, Armonk, NY (US)

(72) Inventors: Timothy M. Burns, Durham, NC (US); Ryan M. Graham, Durham, NC (US); Mark A. Huffman, Durham, NC (US); Todd E. Kaplinger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 15/176,671

(22) Filed: Jun. 8, 2016

(65) Prior Publication Data

US 2017/0359411 A1    Dec. 14, 2017

(51) Int. Cl.
*H04L 29/08* (2006.01)
*H04L 12/26* (2006.01)
*H04L 9/08* (2006.01)

(52) U.S. Cl.
CPC ............ *H04L 67/1002* (2013.01); *H04L 9/08* (2013.01); *H04L 43/08* (2013.01); *H04L 67/141* (2013.01)

(58) Field of Classification Search
CPC ......... H04L 67/10; H04L 67/141; H04L 9/08; H04L 43/08
See application file for complete search history.

(56) References Cited

U.S. PATENT DOCUMENTS

| | | | |
|---|---|---|---|
| 7,085,758 B2 | 8/2006 | Barsness et al. | |
| 8,332,367 B2 | 12/2012 | Bhattacherjee et al. | |
| 8,935,221 B1 | 1/2015 | Lazier et al. | |
| 2009/0094372 A1* | 4/2009 | Nyang | H04L 63/168 |
| | | | 709/229 |
| 2017/0214759 A1* | 7/2017 | Timiskov | H04L 67/28 |
| 2017/0324829 A1* | 11/2017 | Voronkov | G06F 3/0482 |

* cited by examiner

*Primary Examiner* — Kim T Nguyen
(74) *Attorney, Agent, or Firm* — Brown & Michaels, PC; David Woycechowsky (57) ABSTRACT

Reducing concurrency in a system comprising a plurality of services sending a plurality of concurrent requests to a back-end service through a concurrency reduction service. The concurrency reduction service maps each concurrent incoming request to a key; and determines if the key to which the concurrent incoming request is mapped matches a key mapped from another concurrent incoming request from the plurality of concurrent requests. If the key to which the concurrent incoming request is mapped matches a key mapped from at least one other concurrent incoming request from the plurality of concurrent requests, then the service groups the concurrent incoming request with the at least one other concurrent incoming request to be sent to the back-end service. The concurrency reduction service sends one outgoing request to the back-end service for each of the keys to which the plurality of concurrent incoming requests were mapped.

20 Claims, 4 Drawing Sheets

CONCURRENCY REDUCTION SERVICE

BACKGROUND

The present invention relates to microservices architecture for computer networks to reduce concurrency to a back-end service.

In a microservices architecture, it's not uncommon for several instances of the same service to perform the same piece of work at the same time. For example, if five instances of the same service all need to retrieve the same data from a back-end, then a system may encounter behavior where the service instances redundantly request the same data five times. This behavior puts unnecessary stress on the back-end service, and may result in delays or extra memory consumption within the service instances. It would be advantageous if there was a way for service instances to recognize scenarios that may lead to redundant traffic, and prevent that redundancy before it happens.

Various technologies exist to either proxy a back-end service or cache data retrieved from a back-end service.

Caching can improve performance after the first response is received, but does not improve performance for multiple redundant requests.

SUMMARY

According to an embodiment of the present invention, a method of reducing concurrency in a system comprising a plurality of services sending a plurality of concurrent requests to a back-end service through a concurrency reduction service. The method comprising the steps of: a) the concurrency reduction service receiving a plurality of concurrent incoming requests from the plurality of services; b) the concurrency reduction service mapping each concurrent incoming request to a key; c) the concurrency reduction service determining if the key to which the concurrent incoming request is mapped matches a key mapped from another concurrent incoming request from the plurality of concurrent requests; d) if the key to which the concurrent incoming request is mapped matches a key mapped from at least one other concurrent incoming request from the plurality of concurrent requests, then the concurrency reduction service grouping the concurrent incoming request with the at least one other concurrent incoming request; e) the concurrency reduction service repeating the method from step b) until all of the plurality of concurrent incoming requests have been processed; f) the concurrency reduction service sending one outgoing request to the back-end service for each of the keys to which the plurality of concurrent incoming requests were mapped; g) the concurrency reduction service receiving a response from the back-end service for a outgoing request; h) the concurrency reduction service sending the response received from the back-end service to all of the services which sent concurrent incoming requests which mapped to the key; and i) the concurrency reduction service repeating the method from step f) until outgoing requests have been sent to the back-end service for all of the keys.

According to another embodiment of the present invention a computer program product for reducing concurrency in a system comprising a plurality of services sending a plurality of concurrent requests to a back-end service through a concurrency reduction service comprising a computer comprising at least one processor, one or more memories, one or more computer readable storage media, the computer program product comprising a computer readable storage medium having program instructions embodied therewith is disclosed. The program instructions executable by the computer to perform a method comprising: a) receiving, by the concurrency reduction service, a plurality of concurrent incoming requests from the plurality of services; b) mapping, by the concurrency reduction service, each concurrent incoming request to a key; c) determining, by the concurrency reduction service, if the key to which the concurrent incoming request is mapped matches a key mapped from another concurrent incoming request from the plurality of concurrent requests; d) if the key to which the concurrent incoming request is mapped matches a key mapped from at least one other concurrent incoming request from the plurality of concurrent requests, then grouping, by the concurrency reduction service, the concurrent incoming request with the at least one other concurrent incoming request; e) repeating, by the concurrency reduction service, the method from step b) until all of the plurality of concurrent incoming requests have been processed; f) sending, by the concurrency reduction service, one outgoing request to the back-end service for each of the keys to which the plurality of concurrent incoming requests were mapped; g) receiving, by the concurrency reduction service, a response from the back-end service for a outgoing request; h) sending, by the concurrency reduction service, the response received from the back-end service to all of the services which sent concurrent incoming requests which mapped to the key; and i) repeating, by the concurrency reduction service, the method from step f) until outgoing requests have been sent to the back-end service for all of the keys.

According to another embodiment of the present invention, a computer system for reducing concurrency in a system comprising a plurality of services sending a plurality of concurrent requests to a back-end service through a concurrency reduction service comprising a computer comprising at least one processor, one or more memories, one or more computer readable storage media having program instructions executable by the computer to perform the program instructions is disclosed. The program instructions comprising: a) receiving, by the concurrency reduction service, a plurality of concurrent incoming requests from the plurality of services; b) mapping, by the concurrency reduction service, each concurrent incoming request to a key; c) determining, by the concurrency reduction service, if the key to which the concurrent incoming request is mapped matches a key mapped from another concurrent incoming request from the plurality of concurrent requests; d) if the key to which the concurrent incoming request is mapped matches a key mapped from at least one other concurrent incoming request from the plurality of concurrent requests, then grouping, by the concurrency reduction service, the concurrent incoming request with the at least one other concurrent incoming request; e) repeating, by the concurrency reduction service, the method from step b) until all of the plurality of concurrent incoming requests have been processed; f) sending, by the concurrency reduction service, one outgoing request to the back-end service for each of the keys to which the plurality of concurrent incoming requests were mapped; g) receiving, by the concurrency reduction service, a response from the back-end service for a outgoing request; h) sending, by the concurrency reduction service, the response received from the back-end service to all of the services which sent concurrent incoming requests which mapped to the key; and i) repeating, by the concurrency reduction service, the method from step f) until outgoing requests have been sent to the back-end service for all of the keys.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Back end as a Service (BaaS), the capability provided to the consumer to setup, use and operate a cloud backend for their mobile, tablet and web apps. The Back end as a Service provides consumers with a way to link their applications to backend cloud storage while also providing features such as user management, push notifications, and integration with social networking services. These services may be provided through customized Software Development Kits (SDKs) and Application Programming Interfaces (APIs).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
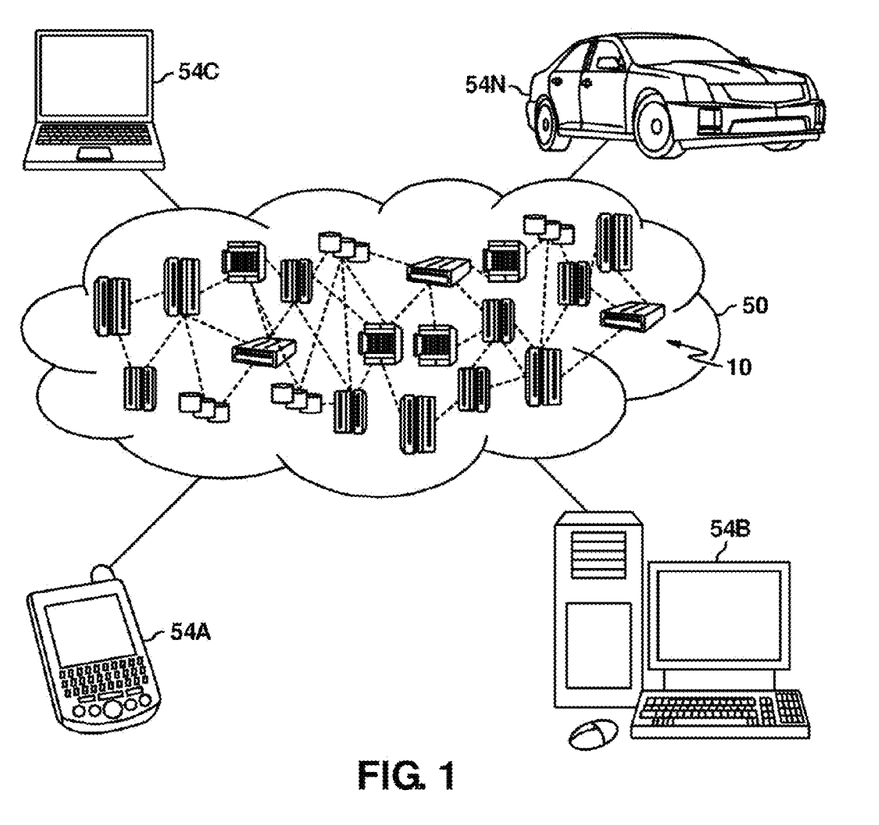
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
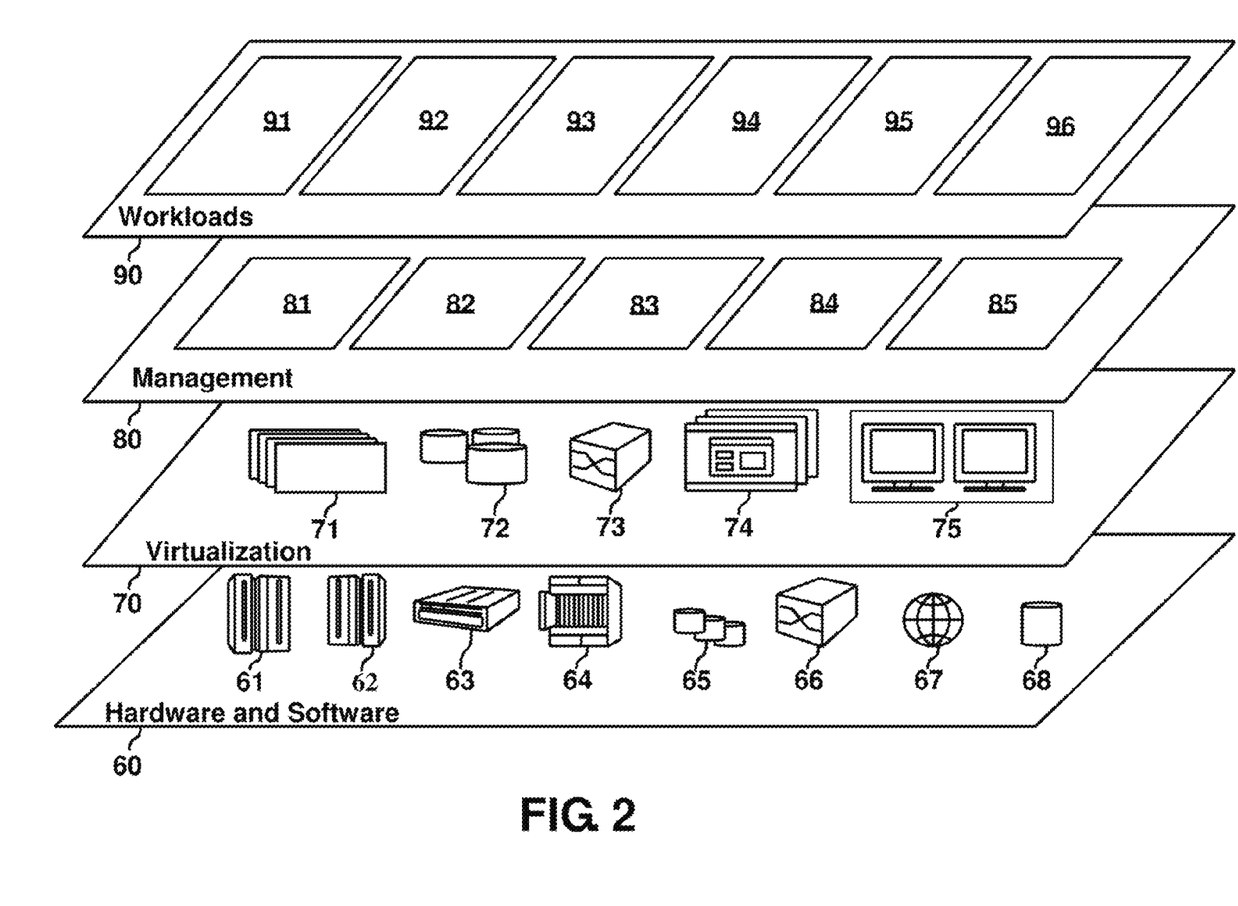
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and concurrency reduction 96.

According to one embodiment of the present invention, instead of making a request to the back-end service directly, each service instance should make a request to an intermediate reduction service. The goal of a reduction service is to prevent redundant concurrent requests to the back-end service. A reduction service can optionally cache responses, but more importantly, it prevents multiple requests from being routed to the back-end service at the same time, even if the first response has not yet been received. This can be seen in the block diagram of FIG. 3, in which a concurrency reduction system is shown.

Figure 3:
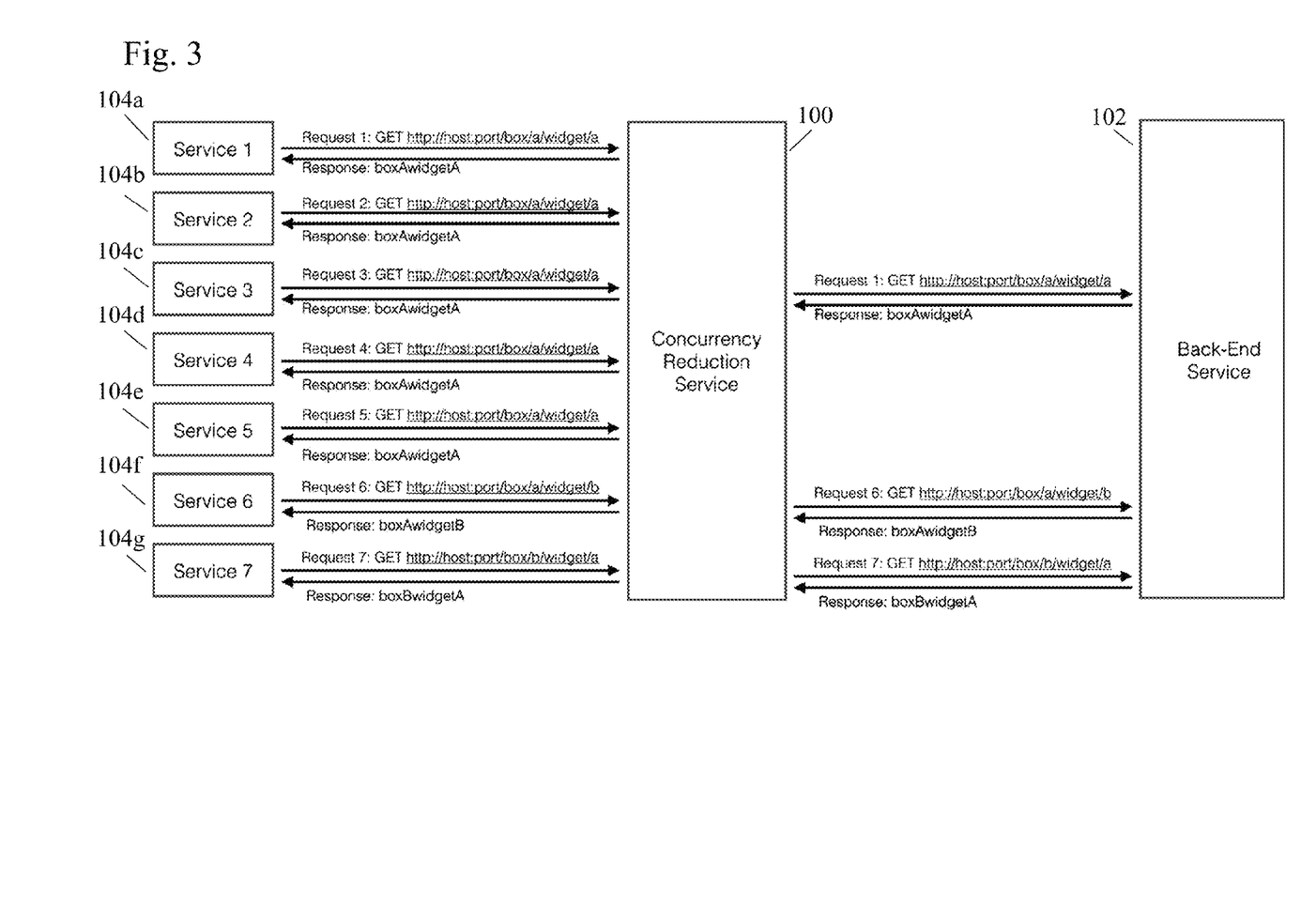
FIG. 3 shows a diagram of a concurrency reduction service.

First, the reduction service maps each incoming request to a key. Then, for every incoming key, the reduction service checks if any existing incoming requests match that key. If a match is detected, then the reduction service will invoke at most one outgoing request to the back-end service, and all incoming requests with a matching key will wait until the back-end service sends a response. If the reduction service receives any subsequent requests with a matching key while that same back-end request is still being serviced, then those requests will preferably wait until the first response is received. In other words, the reduction service reduces redundancy by re-using the same response for multiple redundant requests.

As shown in the example of FIG. 3, seven requests, denoted as request 1 to request 7, from seven services 104a-104g, are to be sent to a back-end service 102. For the purposes of this explanation, let us consider that a string of the form "boxXwidgetY" is the key for a particular resource. It will be understood that while seven services 104a-104g are shown in the figure, any number of services can be handled within the teaching of the invention.

In FIG. 3, services 104a-104e are sending requests 1-5 asking for "boxAwidgetA". Service 104f is sending request 6 for "boxAwidgetB" and service 104g is sending request 7 for "boxBwidgetA". These requests are all being sent "concurrently"—i.e. randomly sent by the services within an arbitrary period of time—rather than being sent and handled "sequentially" where each service waits for the others to complete before sending a request.

If there were no concurrency reduction service 100, this would result in seven separate requests being handled by the back-end service 102, and seven separate responses from the back-end service would result.

Instead, by using the concurrency reduction service 100, there are only three requests—request 1, request 6 and request 7—sent to the back-end service 102. Thus, the five concurrent requests for "boxAwidgetA"—requests 1-5—from services 104a-104e are reduced to one request by the concurrency reduction service 100. When this response is received from the back-end service 102, the concurrency reduction service 100 sends the same response to all of the requests 1-5 which asked for "boxAwidgetA".

Figure 4:
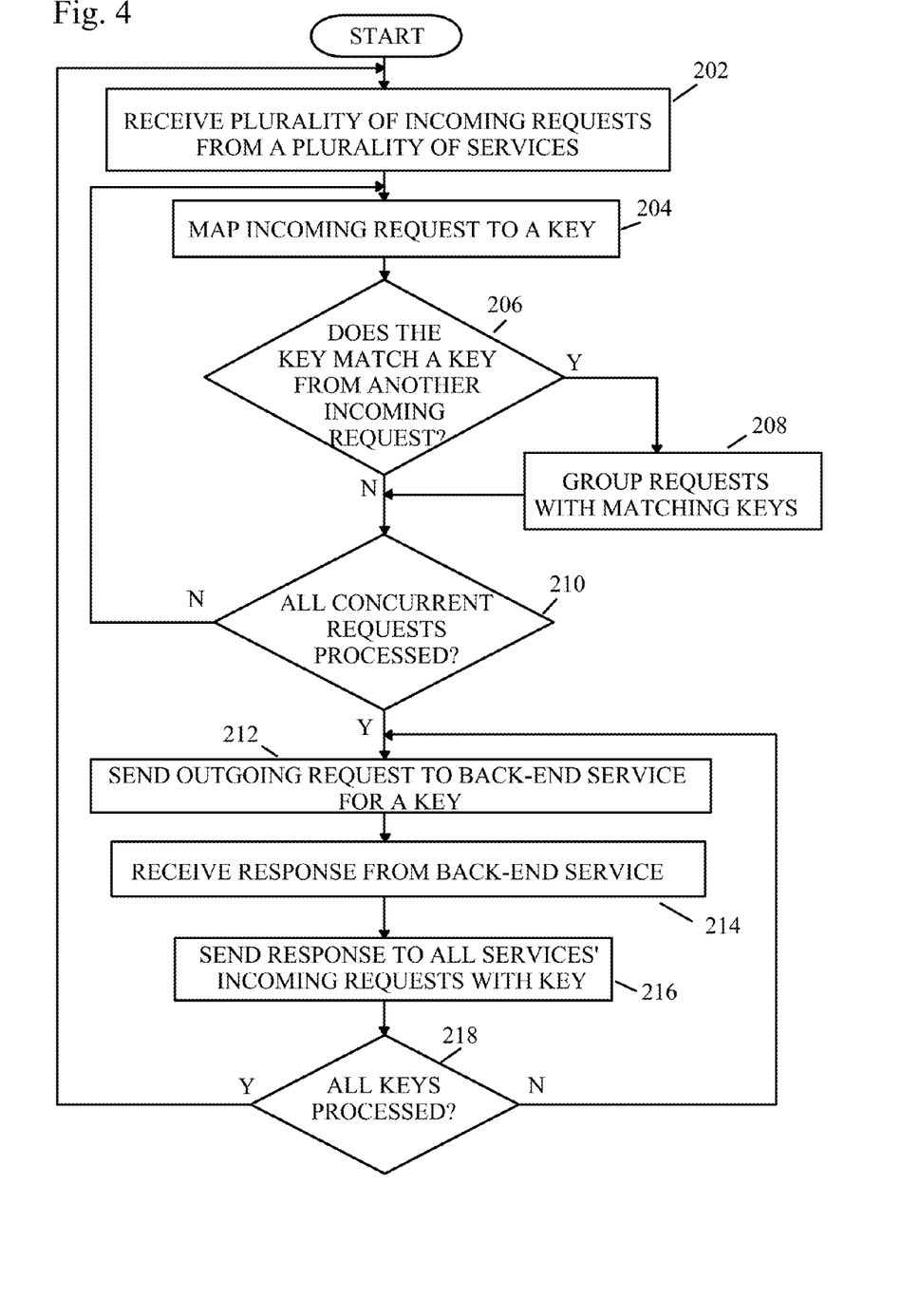
FIG. 4 shows a flowchart of the method.

The method of operation of the concurrency resolution service 100 is shown in the flowchart of FIG. 4, and described below.

The concurrency reduction service 100 receives a plurality of concurrent incoming requests from a plurality of services (step 202).

Next, the concurrency reduction service 100 maps each incoming request to a key (step 204). In some embodiments of the present invention, each incoming request to the concurrency reduction service 100 is assigned a key based, at least in part, upon the information (for example, URL address) being requested. The information being requested will correspond to a resource of a predetermined set of resources that may be requested.

In some embodiments, the identity of the resource being requested will fully determine the key. Keys would be added as new requestable resources are added to the system and reallocated, or dropped, when resources are removed. If the system includes a few thousand requestable resources, then a sixteen-bit key may be used.

The bit strings of the keys and their corresponding requestable resources may be stored, for example, in a look-up table. This look-up table can be stored in a fast cache or kernel, for example, or just stored in ordinary Random Access Memory (RAM).

In some embodiments, the key may be based upon additional information in addition to an identity of a resource about which information is being requested. This additional information could include, for example, information regarding use and processing of the requested information when that information is returned from the back-end service 102 to the concurrency reduction service 100.

For example, assume a request includes a request for a URL address and further includes the following code:
 ?cache=true
This code indicates that the information should be cached at the concurrency reduction service 100 for a predetermined period of time after the URL information is returned from the back-end service 102. In this case there may be separate keys for: (i) requests for the given URL resource with such "?cache=true" cache requests included; (ii) requests for the given URL resource that specify "?cache=false"; and (iii) requests for the given URL resources that don't specify one way or the other regarding the subject of caching at the concurrency reduction service.

The concurrency reduction service 100 can either be given the reduction key as a header/parameter of the request, or the concurrency reduction service 100 can calculate the key based on the request itself. For example, if the Uniform Resource Identifier (URI) of the request complies with the representational state transfer (REST) architecture (usually referred to as a "RESTful string"), then the key might be generated by inspecting the path and query parameters of the URI.

Alternatively, a key-calculation function could be configured in the reduction service itself, and different key-calculation functions could be specified for different routes. For example, a key-calculation function A might be applied to requests originating from one particular domain, while a key-calculation function B might be applied to requests originating from all other domains.

Then, the concurrency reduction service 100 checks if the key for the incoming request matches a key from any of the other incoming requests from the plurality of requests (step 206).

If a match is detected, then the incoming request is grouped with the other incoming requests which had a matching key (step 208).

If all of the plurality of incoming requests have not been processed (step 210), the method loops back to step 204 of mapping an incoming request.

Once all of the incoming requests have been processed (step 206), concurrency reduction service 100 processes the keys from the plurality of incoming requests.

The concurrency reduction service 100 sends one outgoing request to the back-end service 102 for a key (step 212).

The concurrency reduction service 100 will then wait until the back-end service 102 sends a response to the outgoing request.

In step 214, the concurrency reduction service 100 receives the response from the back-end service 102.

The response received from the back-end service 102 is sent to all of the services 104a-104g who sent requests which mapped to that key (step 216).

If all of the keys have not been processed (step 218), the method loops back to step 212 of sending outgoing requests to the back-end service 102. If all of the keys have been processed (step 218), the method repeats from step 202, of getting another plurality of incoming requests.

It should be noted that steps 212 to 216 could be performed sequentially for each of the plurality of keys, sending a request in step 212, then waiting for a response to the request in step 214, and forwarding the request to the services 104a-104g which sent requests with that key, as described above. Alternatively, the steps 212-216 could be performed in parallel, with the method sending out all of the requests for all of the keys in step 212, and then receiving the requests in step 214 and sending the requests on to the services 104a-104g in step 216 as they are provided from the back-end service 102.

In other words, the concurrency reduction service 100 reduces redundancy by re-using the same response for multiple redundant requests.

Note that the concurrency reduction service 100 does not necessarily cache responses. At a minimum, the reduction service 100 prevents redundant concurrent requests from reaching the back-end service 102, and the response from one reduced request is only kept in memory long enough to service all existing matching requests. As an additional value-add, caching could be introduced to further increase performance, and the caching system could reside either inside the concurrency reduction service 100 or as a separate service. However, caching is not required to achieve a performance improvement with the concurrency reduction service 100.

The concurrency reduction service 100 and method of reducing requests does not apply strictly to microservices architectures. It may also be applicable to any multi-threaded environment where multiple threads, processes, CPUs, virtual machines, or services may perform redundant work at the same time. For environments where multiple threads run inside a single process, the reduction logic doesn't need to run as a separate process, and can instead reside inside the same process managing the threads. The request/response mechanism could be HTTP, or any other protocol where requests can be mapped into keys and where the response can be reused.

For example, a Java application running on machine A may submit HTTP requests to a REST API hosted on machine B. If the Java application is multi-threaded, and if it submits requests to machine B without passing the requests through a concurrency reduction logic first, then the Java application might redundantly submit the same exact request to machine B multiple times during the same time period, resulting in unnecessary HTTP traffic and extra strain on machine B. In this example, the concurrency reduction service 100 may be implemented as a Java API running within the same java virtual machine (JVM) as the application logic on machine A. Alternatively, the concurrency reduction service 100 could be implemented as an intermediate process located on machine B that intercepts requests to the REST API, and only puts load on the REST API for unique requests.

The protocol your services use to communicate with the reduction service don't necessarily need to match the protocol used to communicate with the back-end service. For example, the services might use advanced message queuing protocol (amqp) or Redis Protocol Specification (RESP) to register a request for data, even though the response itself could be serviced via http.

The concurrency reduction service can be implemented either as a scalable service in your architecture, or as a library/module embedded in your other services.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention may include one, or more, of the following features, characteristics, operations and/or advantages: (i) intercepting, by an intermediate reduction portion of a data serving service, a plurality of front-end requests, sent through a micro services architecture, respectively from a plurality of instances of a front-end portion of the data serving service to a common back-end portion of the data serving service; (ii) mapping, by the intermediate reduction portion, each of the front-end requests to a respective key that identifies data requested by the respective front-end request, with the mapping including: (a) mapping a first front-end request, received from a first instance of the front-end portion, to a first key, and (b) mapping a second front-end request, received from a second instance of the front-end portion, to a second key; (iii) sending a first back-end request, by the intermediate portion and to the back-end portion, a request for data corresponding to the first front-end request; (iv) determining, by the intermediate reduction portion and before receiving from the back-end portion data responsive to the first back-end request, that the second key matches the first key; (v) responsive to the determination that the second key matches the first key and further responsive to receipt of data responsive to the first back-end request by the intermediate portion and from the back-end portion, sending the data responsive to the first back-end request to at least the first instance of the front-end portion and the second instance of the front-end portion without sending any back-end requests based on the second front-end request received by the intermediate portion from the second instance of the front-end portion; (vi) the second front-end request is a concurrent request that is prevented, by the intermediate portion, from reaching the back-end portion; and/or (vii) a plurality of a concurrent front-end requests of the plurality of front end-requests, which are concurrent with the first front-end request and having a respectively corresponding key matching the first key, are prevented, by the intermediate portion, from reaching the back-end portion.

What is claimed is:

1. A method of reducing concurrency in a system comprising a plurality of services sending a plurality of concurrent requests to a back-end service through a concurrency reduction service, the method comprising the steps of:
    a) the concurrency reduction service receiving a plurality of concurrent incoming requests from the plurality of services;
    b) the concurrency reduction service mapping each concurrent incoming request to a respective key of a plurality of keys;
    c) the concurrency reduction service determining that a plurality of common key incoming requests of the plurality of requests each have been mapped to a first key of the plurality of keys;
    d) the concurrency reduction service sending a single common key outgoing request, corresponding to the first key, to the back-end service;
    e) the concurrency reduction service receiving a common key response to the common key outgoing request from the back-end service;
    f) the concurrency reduction service sending the common key response received to all of the services from which the concurrency reduction service received a common key incoming request.

2. The method of claim 1, in which in step b) of mapping each concurrent incoming request to a respective key of a plurality of keys, the key is assigned based, at least in part, upon information being requested.

3. The method of claim 2, in which the information being requested is an identity of a resource.

4. The method of claim 1, in which in step b) of mapping each concurrent incoming request to a respective key of a plurality of keys, the key is assigned based, at least in part, upon information in a header of the request.

5. The method of claim 1, in which in step b) of mapping each concurrent incoming request to a respective key of a plurality of keys, the key is assigned by calculating the key from the request.

6. The method of claim 1, in which in step b) of mapping each concurrent incoming request to a respective key of a plurality of keys, different key-calculation functions are used to map keys for concurrent incoming requests sent by different services.

7. The method of claim 1, further comprising the step of the concurrency reduction service storing the keys.

8. The method of claim 4, in which the keys are stored in a look-up table.

9. A computer program product for reducing concurrency in a system comprising a plurality of services sending a plurality of concurrent requests to a back-end service through a concurrency reduction service comprising a computer comprising at least one processor, one or more memories, one or more computer readable storage media, the computer program product comprising a computer readable storage medium having program instructions embodied therewith, the program instructions executable by the computer to perform a method comprising:
    a) receiving, by the concurrency reduction service, a plurality of concurrent incoming requests from the plurality of services;
    b) mapping, by the concurrency reduction service, each concurrent incoming request to a respective key of a plurality of keys;
    c) determining, by the concurrency reduction service, that a plurality of common key incoming requests of the plurality of requests each have been mapped to a first key of the plurality of keys;
    d) sending, by the concurrency reduction service, a single common key outgoing request, corresponding to the first key, to the back-end service;
    e) receiving, by the concurrency reduction service, a common key response to the common key outgoing request from the back-end service; and
    f) sending, by the concurrency reduction service, the common key response to all of the services from which the concurrency reduction service received a common key incoming request.

10. The computer program product of claim 9, in which in step b) of mapping each concurrent incoming request to a respective key of a plurality of keys, the key is assigned based, at least in part, upon information being requested.

11. The computer program product of claim 10, in which the information being requested is an identity of a resource.

12. The computer program product of claim 9, in which in step b) of mapping each concurrent incoming request to a respective key of a plurality of keys, the key is assigned based, at least in part, upon information in a header of the request.

13. The computer program product of claim 9, in which in step b) of mapping each concurrent incoming request to a respective key of a plurality of keys, the key is assigned by calculating the key from the request.

14. The computer program product of claim 9, in which in step b) of mapping each concurrent incoming request to a respective key of a plurality of keys, different key-calculation functions are used to map keys for concurrent incoming requests sent by different services.

15. The computer program product of claim 9, further comprising the step of the concurrency reduction service storing the keys.

16. A computer system for reducing concurrency in a system comprising a plurality of services sending a plurality of concurrent requests to a back-end service through a concurrency reduction service comprising a computer comprising at least one processor, one or more memories, one or more computer readable storage media having program instructions executable by the computer to perform the program instructions comprising:
   a) receiving, by the concurrency reduction service, a plurality of concurrent incoming requests from the plurality of services;
   b) mapping, by the concurrency reduction service, each concurrent incoming request to a respective key of a plurality of keys;
   c) determining, by the concurrency reduction service, that a plurality of common key incoming requests of the plurality of requests each have been mapped to a first key of the plurality of keys;
   d) sending, by the concurrency reduction service, a single common key outgoing request, corresponding to the first key, to the back-end service;
   e) receiving, by the concurrency reduction service, a common key response to the common key outgoing request from the back-end service; and
   f) sending, by the concurrency reduction service, the common key response to all of the services from which the concurrency reduction service received a common key incoming request.

17. The computer system of claim 16, in which in step b) of mapping each concurrent incoming request to a respective key of a plurality of keys, the key is assigned based, at least in part, upon information being requested.

18. The computer system of claim 16, in which the information being requested is an identity of a resource.

19. The computer system of claim 16, in which in step b) of mapping each concurrent incoming request to a respective key of a plurality of keys, the key is assigned based, at least in part, upon information in a header of the request.

20. The computer system of claim 16, in which in step b) of mapping each concurrent incoming request to a respective key of a plurality of keys, the key is assigned by calculating the key from the request.

* * * * *